Sept. 8, 1970            M. JENNER            3,527,390
FLAVOR AND SPICE INJECTOR FOR FOOD PRODUCTS
Filed Sept. 17, 1968            2 Sheets-Sheet 1
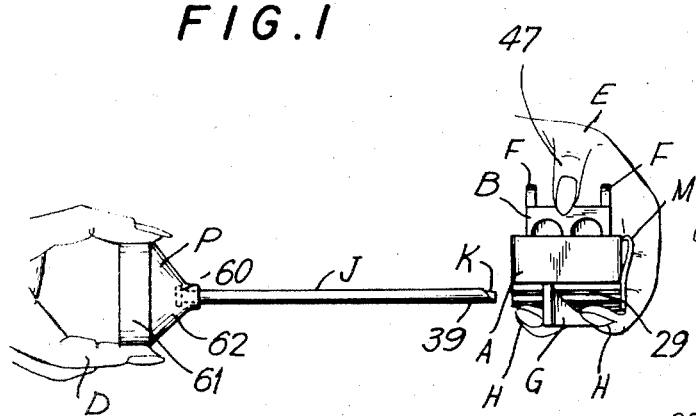
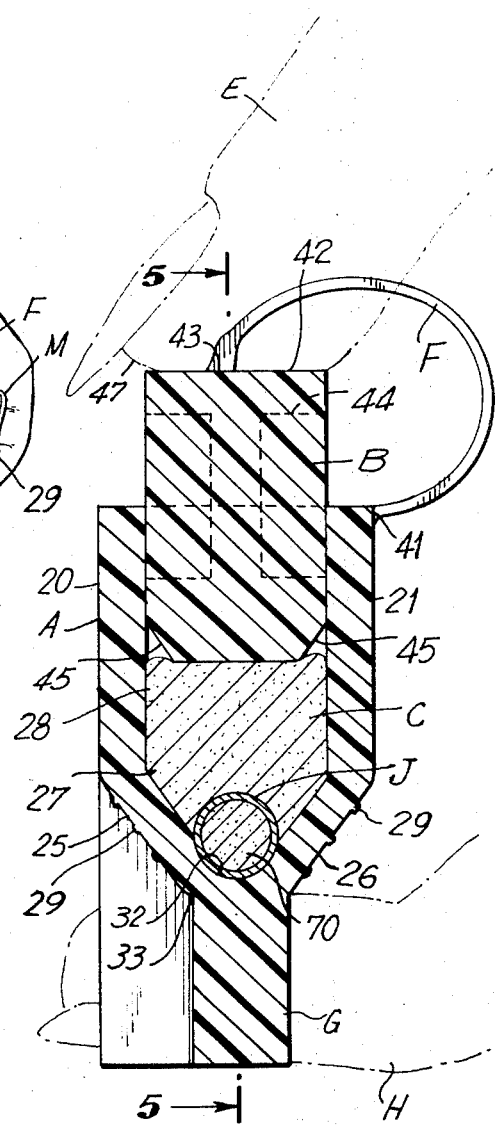
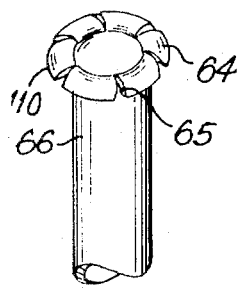
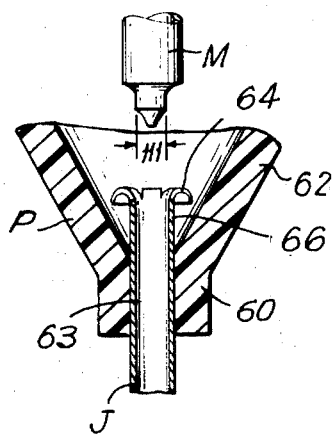
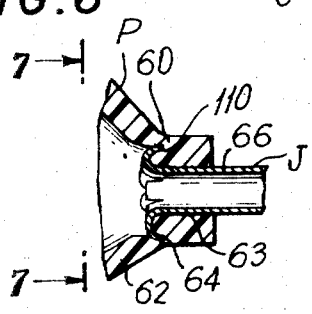
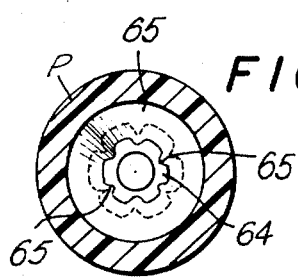
INVENTOR.
MYRON JENNER
ATTORNEY Sept. 8, 1970 M. JENNER 3,527,390
FLAVOR AND SPICE INJECTOR FOR FOOD PRODUCTS
Filed Sept. 17, 1968 2 Sheets-Sheet 2
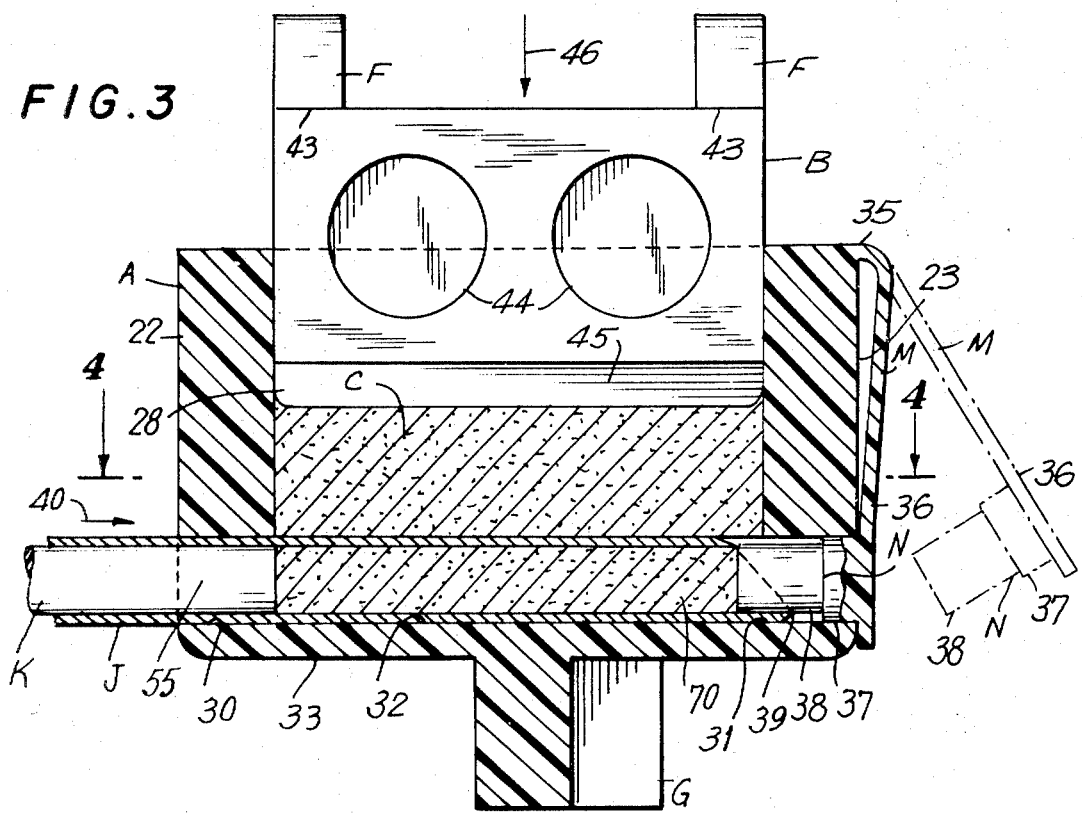
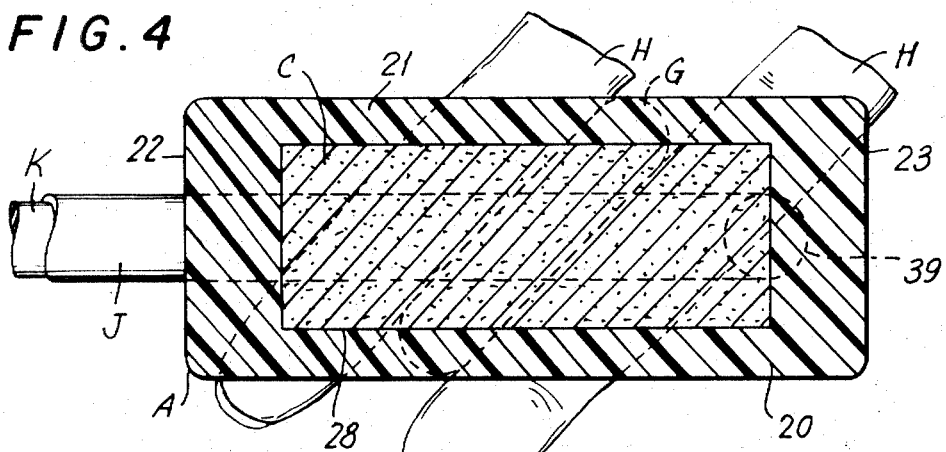
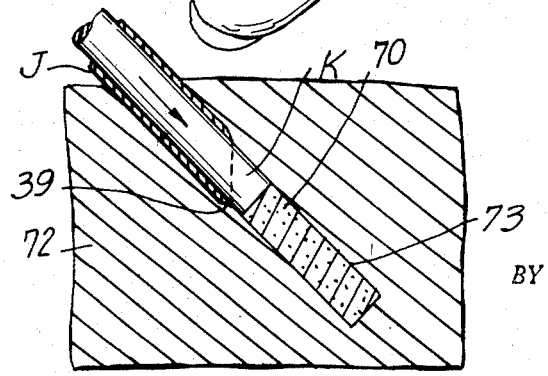
INVENTOR.
MYRON JENNER
BY
ATTORNEY 3,527,390
FLAVOR AND SPICE INJECTOR FOR FOOD PRODUCTS
Myron Jenner, Bethel, Vt. 05032
Filed Sept. 17, 1968, Ser. No. 760,134
Int. Cl. B67d 5/42
U.S. Cl. 222—388                                             7 Claims

ABSTRACT OF THE DISCLOSURE

The disclosure of the present invention relates to a hand operated injector for injecting materials into meat products and other food before, during and after baking, in which a container is provided for material, through the lower portion of which is inserted a tubular member which is inserted a tubular member which will take up a portion of the material and which is provided with a plunger for injecting the same into the food product. Among the materials which may be injected are tenderizing powders, spices, condiments, butter, flavoring and preparation materials in general.

DESCRIPTION OF THE INVENTION

The present invention relates to a novel injector device for injecting tenderizing powder, spices and flavoring material into food products.

It is among the objects of the present invention to provide a simple hand manipuated durable device, which can carry various types of tenderizing powder, spices and flavoring material and which, by ready easy manipulation, will make possible insertion thereof into the body of the food product.

Another object is to provide an injector device for permitting a housewife or chef to inject within meats, potatoes and other foodstuffs various types of tenderizing powder, spices and flavoring material to enhance the characteristics thereof after cooking has been completed.

Another object is to provide a means and method readily manipulated by the housewife or chef for injecting into food products predetermined quantities of tenderizing powder, spices and flavoring material without opening up the food product and during, after or before the cooking, baking or roasting operation.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

The present application relates to improvements upon the subject matter of Pat. 3,241,477, issue Mar. 22, 1966, to Myron Jenner.

In accomplishing the above objects, a container chamber is provided, of relatively small size, for example between one and two inches in length and one to one and a half inches in depth and one-half to three-quarters of an inch in thickness, which will have an open top and a convergent bottom, through the lower portion of which extend inlet and outlet side openings for receiving the tubular member having oblique end insertion portion.

The container is desirably molded of a thermoplastic, such as polypropylene, and on the lower portion an integral oblique fin is desirably formed for enabling convenient grasping thereof between the second and third fingers at the bottom of the container. By integrally molded strips, a cover and compressor member is also provided for fitting into the top of the container, which will serve to compress the tenderizing powder, spices and flavoring material placed in the container. The upper edge of the container may also carry, by a flexible integral strip, a plug member for fitting into the outlet opening to close the opening and also to serve as means for tamping the material in the oblique end of the tubular member.

The plug is stepped so that the outer portion thereof will closely fit the opening, while the inner portion thereof will fit into the tubular member and tamp the spice or other powdered material into the injector needle. The pressure cover will normally be held down by one of the fingers of the user, preferably the thumb, while the lower part of the container is being held by the first and second fingers. The downwardly projecting fin member on the lower part of the container to be held angularly or turned by the fingers.

This will prevent the user from placing a finger before the exit or outlet side opening, thus preventing any injury.

This cover will press down the spice or other material in the container toward the bottom area and where it is in the path of the injector needle. The cover or compressor member has openings therein to reduce the quantity of plastic and lessen the weight.

The injector member consists of stainless steel tubing with the insert end beveled and the other end having a turned serrated head or end portion for attachment to the plastic handle, which is conical in shape. This turned serrated end may be readily heat-sealed by pressure on the serrated head of the needle so that the plastic will flow on both sides of the serrated head and through the openings in the serrations to form bosses of plastic extending through said openings. These serrations permit the plastic to flow from below and through the serrations, forming a raised boss at each opening in each serration, making a neat appearing permanent junction, which will prevent any relative rotary motion of the handle in respect to the needle. This junction between the tubular needle and plastic conical head is achieved by inserting the needle into the opening in the bottom of the plastic handle and then forcing the needle head downwardly to a predetermied depth in the handle which will control the amount of plastic which flows to the top of the serrated head.

This is accomplished by a manually actuated heated tool which has the form of the needle head and is pushed against the heated head of the needle.

The plunger itself may be projected through the tubular member after it has been injected in the food product forcing the condiment, spice or other material therethrough and into the meat or other food product.

Where the material to be injected is garlic or a similar solid, the needle should be passed through the bottom of the container, displacing the plunger. When powdered or finely divided material is used, the injector needle is inserted up to the plug, which is placed in position in the outlet opening and the powder will displace the plunger in the needle and will be tamped by the reduced diameter portion of the plug which will fit into the beveled end of the needle.

The needle is then withdrawn and the condiment or other material is injected into the meat or other material before, during or after cooking. The plunger will then be pressed inwardly to inject the condiment or other material into the body of the material being cooked. By slowly withdrawing the needle while the plunger is being pressed, the tenderizing powder, spices and flavoring material may be distributed along the path of the needle.

Where material such as garlic, olives, onions or cloves are employed, the end of the needle will also act as a shear and shear off portions of the solid flavoring material. The tamping with powdered materials prevents spillage when the needle is removed from the bottom of the container.

BRIEF DESCRIPTION OF DRAWINGS

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a side elevational view showing the use of the tubular needle and plunger, upon being injected into the container, with the plug closed.

FIG. 2 is a transverse sectional view upon an enlarged scale as compared to FIG. 1, taken upon the line 4—4 of FIG. 1, showing the needle in position in the bottom of the container.

FIG. 3 is a transverse vertical sectional view upon an enlarged scale as compared to FIG. 1, upon the line 3—3 of FIG. 2.

FIG. 4 is a transverse horizontal sectional view taken upon the line 4—4 of FIG. 5.

FIG. 5 is a fragmentary sectional view, showing the manner of injection of the needle into the foodstuff being cooked or roasted.

FIG. 6 is a fragmentary transverse sectional view upon the line 6—6 of FIG. 3, with the plunger removed, upon an enlarged scale as compared to FIG. 1.

FIG. 7 is a transverse vertical view taken upon the line 7—7 of FIG. 6, showing interiorly the connection between the tubular plunger and the injector handle.

FIG. 8 is a top perspective view of the tubular plunger before it is connected with the injector handle.

FIG. 9 is a view showing the position of the serrated head of the tubular plunger before it is embodied by heat and fusion into the handle.

Referring to FIGS. 1 to 3, the container A is provided with a cover serving as a compressor member B and it may receive tenderizing powder, granular spices or cloves of garlic C.

Normally, in the filling, two hands are employed, the left hand D to hold the sides of the container A and the other hand E to fill the container with either a clove of garlic, scallions, onions, green pepper, tomato, celery, olives, cheese, lemon or orange rind, mushrooms, water chestnuts, or various types of granular or powdered spices, or even such condiments as butter or other flavorings. The cover B has the integrally molded straps or strips F which will hold the cover B to the container A.

The two straps or strips F will form a loop above the container in the manner shown in FIGS. 1 and 2 and will guide the finger, or preferably the thumb, so that it will take a middle position. Desirably, the container and cover B are formed of polypropylene.

At the lower portion of the container is the oblique bar G, which may be termed a twist bar, designed to be held between two fingers indicated at H in FIGS. 2 and 3, which will extend obliquely across the bottom of the container A and assure that the container will not slip and that the fingers will not come in contact with the sharpened insert end of the needle or tubular member J passing through the bottom of the container A.

Inside of the needle J will be the plunger K, which slidably but loosely fits within said tubular needle J. Also connected to the side of the chamber A by the integral strap M is the spice plug member N. The member N and strap M are desirably molded integrally with the container A. The needle K will have a conical plastic handle P, also preferably of polypropylene, which may be grasped by the hand D and used for inserting the needle through the lower part of the container A.

Polypropylene will permit the hinge straps F and M to be repeatedly flexed without breaking and will also permit cleaning in hot water and automatic dishwashers. The polypropylene is resistant to detergents and will be stain and doro resistant and will even be resistant to steam up to 15 pounds pressure which may have a temperature of as high as 280° F.

Referring particularly to FIGS. 2 to 5, the container A has the side walls 20 and 21 and the end walls 22 and 23. The side walls are somewhat thinner than the end walls 22 and 23. The side walls converge at their lower portions, as indicated at 25 and 26, to form a chamber 27 of decreasing capacity downwardly directly below and communicating with the upper chamber 28. The walls 25 and 26 may be provided with the ridges 29 to aid in the grasping of the lower portion of the container by the fingers H. The end walls 22 and 23 are provided with the inlet and outlet openings 30 and 31, for receiving the tubular member J. The tubular member J will ride on the lower rounded portion 32 of the interior of the container A at the bottom of the chamber 27.

The bar G constitutes an integral extension from the bottom 33 of the container A and it will extend at an angle of about 45° across the bottom between the fingers H, so that it may direct the holding position of the fingers H, as shown in FIGS. 1 and 4. This will take the fingertips out of the path of the reciprocating needle J and make certain that the needle J is not in contact with the hand during the operation of the device. The bar G will prevent the container A from slipping in the finger grip as the tubular needle member J is inserted for loading.

With spices or other finely divided materials, such as tenderizer powder, the device will not project beyond the outlet opening, with the plug N in position with garlic or other materials which will be cut by the beveled end of the needle or tubular injector. The plug N may be removed and the needle J may be pressed through both the inlet and outlet openings. The material that collects inside of the needle J will normally move back the plunger K and press it so that it extends beyond and above the handle P.

The plug member N, as shown best in FIG. 3, has an integrally molded strap M attached to the side wall 23 at 35, which extends to the top 36 of the plug. The plug N has an enlarged portion 37, which will closely fit within the opening 31 and it has a stepped down portion 38 which will fit within the interior of the bevel or oblique cut end 39 of the reciprocating needle J. This portion 38 of the plug N will assure that the material which is gathered up by the reciprocatory movement of the tubular needle J will be compressed or tamped within the cylindrical needle inside of the bevel 39.

This is particularly useful with powdered or finely divided spice or flavoring materials which are to be injected within a foodstuff before, during or after preparation by cooking, roasting or the like. The enlarged portion 37, when inserted in the opening 31, will seal the opening, while the reduced diameter portion 38 will snugly fit within the end 39 of the cylindrical needle.

Normally, the pressure cover B will always compress the material downwardly, whether it be powder, such as tenderizer, spices or condiments, or material such as garlic cloves, olives, onions or the like. This will assure that the material will always be in the path of the tubular cutter. At the same time the stepped down portion 38 of the plug N is particularly useful with spices, tenderizer and other powdered or pulverulent materials. Where it is desired to compress the material inside of the beveled or oblique end 39 of the reciprocating needle J, this will assure against spillage when the needle is removed and will also hold the tenderizer, spice or other material as it is injected into the foodstuff.

Usually, with any type of powdered material, the reciprocating needle J is twisted through the material to be picked up until the beveled oblique cut end 39 meets the shoulder between the enlarged portion 37 and the stepped down portion 38, and it then may be withdrawn, with the plug N remaining in position.

The compressor cover B, as best shown in FIG. 2, is affixed to the body or container A by the two integrally molded strips F, which extend from the upper edges 41 of the container A to the top 42 of the pressure cover B, to which it is connected as indicated at position 43 at the side edges thereof. These straps F project upwardly above the top 42 of the cover B and form a guide for the thumb E as indicated in FIG. 2, centering it upon the top of the cover B.

The straps F will also hold the thumb in place, preventing it from slipping as the needle is inserted in the main portion of the container or flavor chamber A and as the needle is being operated or filled. The lower side edges of the cover B, as indicated at 45 in FIG. 2, are beveled. This will assure that all material of a flavoring or condiment nature in the flavor chamber of container A is normally pressed downwardly into the area through which the needle is reciprocated during loading. The plug is normally pressed downwardly as indicated at 46 in FIG. 3 by the thumb 47.

The pressure cover B will serve to press the material in the container A downwardly toward the lower oblique chamber 27 into the path of the tubular member J. The cover B snugly fits within the chamber 28 and its sides have the enlarged openings 44.

The tubular member J desirably is sharpened at the outlet end 39, which can cut into solid flavoring materials which may be inserted in the chamber A, such as fragments or cloves of garlic, onions, green pepper and so forth. It will serve equally well to compress finely divided, powdered or flaked flavoring materials, such as tenderizer, pepper, sugar or herbs of various types then the plug N is inserted, closing the outlet end 31.

Referring to FIGS. 6 and 7, the tubular needle J is readily and permanently imbedded in the base 60 of the conical handle member P. The conical handle member P has a cylindrical portion 61, a conical portion 62 and a relatively heavy base portion 60, and is made of a thermoplastic resin, such as polypropylene or any other thermoplastic material, and the conical portion 60 may receive the tubular needle which is then projected through the opening 63 in the base portion 60.

If this stainless steel or other metal member is then heated at its end 66, and heated and pressed upon insertion, the overturned serrated heat element 64 thereof will become engaged in the base, which will become softened and will flow upwardly through openings 65, and form a permanent junction which will not be readily disturbed and will permanently attach the needle J to the handle member P during usage.

The plastic will sufficiently cover the edge 110 to imbed it in the handle. The tool diameter 111 is less than the width or diameter of the serrated head so as to control the size of the bosses and its outer edges will be inside of the bosses.

Normally, the needle J will be inserted through the base of a handle member P with its serrated head in the bottom of the conical recess. When a pointed tool M is inserted in said serrated head, the polypropylene will become softened and will flow through the resistant portion 65 and form bosses on the handle side which will not only securely attach the needle but assure that there will be no relative rotary movement between the needle J and the plastic handle P during usage.

Polypropylene, being on both sides of the serrated metal head portions 64, holds the needle tightly and securely.

The plastic will be on both sides of the serrated metal head and will not loosen when the needle unit is placed in hot or boiling water during washing or sterilizing or even under stream pressure of 15 pounds.

If the plunger K is slowly pressed downwardly as the needle J is withdrawn from the foodstuff being flavored, there will be an extended path over which the tenderizer or other flavor or powdered material is distributed, giving an enhanced effect.

In operation, the plunger K will be in position when the needle is inserted in the direction 40, as indicated at 55, with the plug end closed, as shown in FIG. 3. The plunger K, which closely fits the interior of the needle J, will be pushed rearwardly when the condiment is taken up in the needle. When the needle, as indicated at FIG. 5, has been inserted in the foodstuff, the plunger K may be pressed forward, injecting the tenderizer or other material 70 into the body 72 of the food material, as indicated at 73 in FIG. 5.

Having now particularly described and ascertained the nature of the invention, and in what manner the same is to be performed, what is claimed is:

1. A plastic tenderizer flavor and spice injector for injecting flavoring materials into meat and other foodstuffs, comprising a container to receive the materials for injection having an open top to receive the flavoring materials, side and end walls and a bottom portion having opposite aligned inlet and outlet openings below the end walls and a plug in the outlet opening, a tubular injector member reciprocable through said bottom portion and said openings, said injector member having a reciprocable plunger therein to inject the flavoring materials carried by the tubular injector and a cover to fit into the top of the container and press the materials downwardly toward the bottom portion.

2. The injector of claim 1, said cover and plug being attached to the container by integrally formed plastic strap members.

3. The injector of claim 1, said plug to seal said outlet opening being shouldered to tamp the material into said reciprocable plunger in the bottom of said container.

4. The injector of claim 1, said container having an oblique fin projecting from the bottom thereof for placement of the fingers and the thumb or other finger being designed to press down upon the cover to prevent the container from slipping in the hand and also protect the finger tips from the contacting the end of the tubular injector.

5. The injector of claim 1, said container having convergent side walls in said bottom portion and said convergent side walls having exteriorly arranged ribs to enable better grasping of the device.

6. The injector of claim 1, said tubular injector member being of stainless steel and said injector member having a handle of plastic polypropylene and the end of said injector member attached to said handle having a serrated end portion fused and sealed to the handle with plastic on both sides of the serrated end.

7. The injector of claim 1, the tubular injector member having turned-over separated flanges at one end and the handle being attached to said end and being fused and sealed to the handle, plastic bosses being formed so as to permanently attach the tubular injector to the handle and prevent rotary movement of the needle in respect to the handle.

References Cited

UNITED STATES PATENTS

| | | | |
|---|---|---|---|
| 1,222,667 | 4/1917 | Pretzel | 222—388 |
| 1,761,875 | 6/1930 | Cordell | 222—338 X |
| 2,622,434 | 12/1952 | Rutka | 222—386 X |
| 2,761,305 | 9/1956 | Davis | 222—386 X |
| 3,401,692 | 9/1968 | Harris | 222—388 X |

ROBERT B. REEVES, Primary Examiner